United States Patent [19]
Bush

[11] 3,714,824
[45] Feb. 6, 1973

[54] APPARATUS FOR MEASURING SKIN FRICTION

[75] Inventor: Clarence C. Bush, Bel Air, Md.

[73] Assignee: The United States of America as represented by the Secretary of the Army

[22] Filed: Dec. 21, 1970

[21] Appl. No.: 100,018

[52] U.S. Cl. ................. 73/117.4, 73/147, 340/239 R
[51] Int. Cl. ............................................. G01m 17/00
[58] Field of Search ................... 73/9, 147, 56, 117.4; 340/239 R; 200/81.9 R

[56] References Cited

UNITED STATES PATENTS

| | | |
|---|---|---|
| 2,538,785 | 1/1951 | Karig ................................. 73/56 X |
| 3,383,914 | 5/1968 | MacArthur ........................... 73/147 |
| 3,423,551 | 1/1969 | Starbuck ....................... 340/239 R X |
| 3,205,705 | 9/1965 | Telley ................................. 73/117.4 |

Primary Examiner—Louis R. Prince
Assistant Examiner—Daniel M. Yasich
Attorney—Harry M. Saragovitz, Edward J. Kelly and Herbert Berl

[57] ABSTRACT

A ring shaped element is placed in the path of flowing fluid. Gravity holds the element down until skin frictional forces of the flowing fluid lift it off its seat. At the point of lift-off the precise degree of skin friction is known.

6 Claims, 3 Drawing Figures

Flow recovery scoop 4

Nozzle extension 2

Nozzle 1

Flow

Non conductive path

INVENTOR,
Clarence C. Bush

BY: Harry M. Saragovitz,
Edward J. Kelly &
Herbert Berl     ATTORNEYS

APPARATUS FOR MEASURING SKIN FRICTION

The invention described herein may be manufactured, used, and licensed by or for the Government for governmental purposes without the payment to me of any royalty thereon.

BRIEF SUMMARY

In prior art devices for determining skin friction an isolated section of a fluid dynamic surface is permitted to be displaced a small amount as the fluid passes thereover. A force measuring balance determines the amount of movement of the isolated section and thereby indicates the magnitude of the skin friction causing movement of the section. However, the force measuring balance must be extremely sensitive and is therefore an expensive piece of precision apparatus. Further, the isolated section must be separated slightly from adjacent nonmovable sections and the crack therebetween can cause turbulence and inaccurate readings on the force measuring balance. Still further the magnitude of the turbulence, and the error caused thereby, will vary with different velocities of fluid flowing thereover. Motion-nulling apparatus can be used to keep the isolated section stationary, while measuring the degree of force acting thereon. However, such apparatus is of a high quality and very expensive.

The present invention is extremely simple, low-cost, rugged, reliable, and does not present problems associated with the crack as discussed above.

IN THE DRAWING

Figure 1:
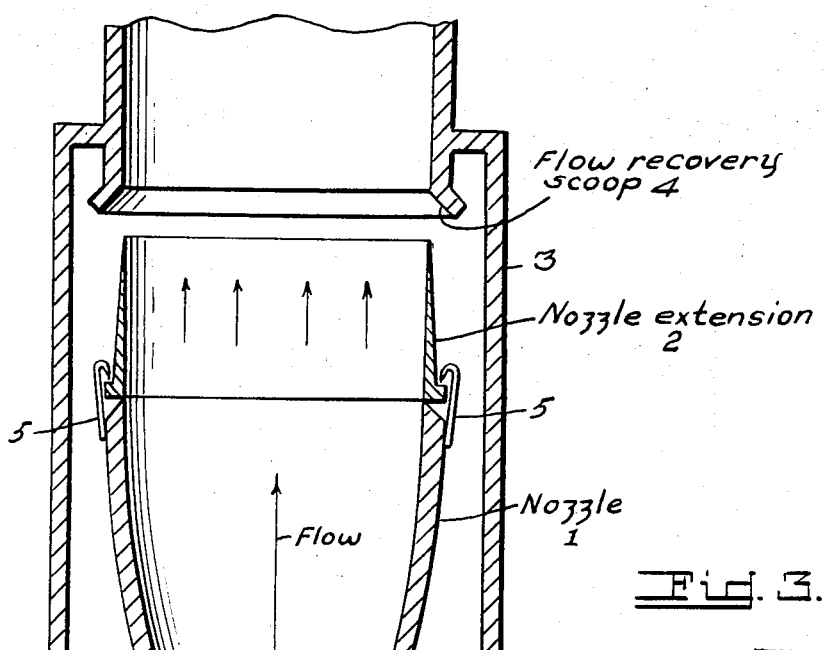
FIG. 1 is a cross section of one form of the invention.

In FIG. 1 a fluid (gas or liquid) flows upwardly through nozzle 1 which preferably terminates in a sharp circular edge to reduce friction. A nozzle extension ring 2 is contoured to present a smooth fit with the interior of nozzle 1. Nozzle extension ring 2 preferably has a sharp circular top edge to minimuze fluid flow disturbance when the fluid stream exits therefrom. Closed chamber 3 surrounds the nozzle and has a flow recovery scoop 4 to minimize disturbance to flow in a manner well understood by those skilled in the art. Gravity holds nozzle extension 2 in loose seating contact with nozzle 1 until skin friction between the flowing fluid and extension 2 lifts the extension.

Figure 2:
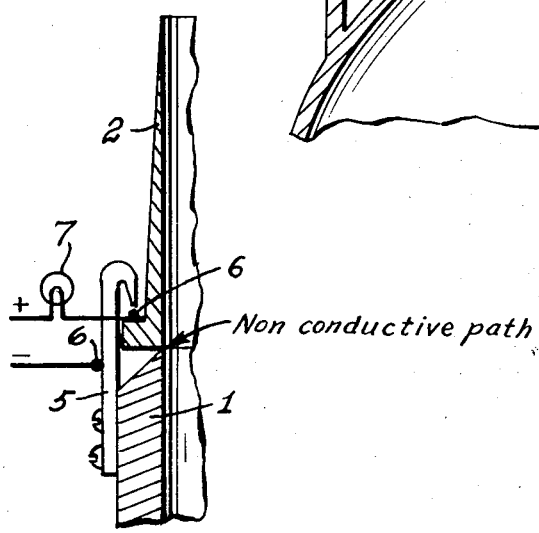
FIG. 2 is a detail of the ring hold-down and electrical circuitry.

A plurality (three or more) of retainers 5 prevent lateral movement or misalignment of nozzle extension 2 with respect to nozzle 1 and limit upward movement of extension 2. When nozzle 2 does leave its seat electrical contacts 6 close to illuminate lamp 7 and tell the operator that we have lift-off. As illustrated in FIG. 2, the extension ring 2 and the nozzle 1 obviously provide an non - conducting path so as to keep the lamp 7 in the extinguished condition.

Figure 3:
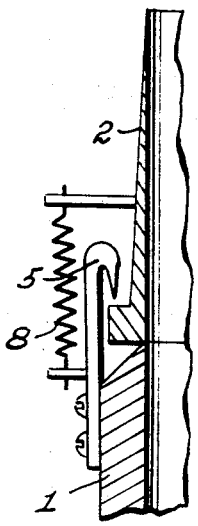
FIG. 3 is a modification utilizing a spring to complement or to oppose gravity.

In FIG. 3 springs 8 are illustrated. Springs 8 may be tension springs to assist gravitational force in keeping the nozzle extension seated for measuring higher skin friction forces. Or, springs 8 may be compression springs to oppose gravity and help lift the nozzle extension to measure very low skin frictional forces.

The point at which nozzle extension 1 is lifted from its seat will depend on several factors including the weight of the nozzle, the degree of roughness of the interior surface of the nozzle extension, the rate of fluid flow, viscosity index of the fluid being tested, and so on. When testing the skin friction of a particular fluid the viscosity index will be constant.

As one example, suppose we need to know the coefficient of skin friction of a particular material in contact with air at a supersonic velocity (at near 2,000 MPH for example). Nozzle extension 2 is made of the material to be tested and the extension is constructed heavy enough to remain seated at 2,000 MPH air flow. Under test the nozzle may lift off at 1,900 MPH. We then know that the coefficient of skin friction is too great. Or, if the nozzle extension should remain seated up to 2,100 MPH the skin friction is lower than expected.

As another example, suppose we want to test for the coefficient of skin friction of a boat hull material at 40 MPH in water. The nozzle extension ring 2 is constructed of the material and heavy enough to remain seated at 40 MPH. If we observe lift-off at 38 MPH the skin friction is too great. If the velocity is increased to 42 MPH before lift-off the skin friction is not as great as anticipated.

For some test purposes, it may be advantageous to use the test material only as a liner of the nozzle extension. The main body may be made, for example, of lead for heavy weight or of aluminum or plastic for light weight. The liner may be a piece to be tested of highly polished casting or rolled sheet, or a piece to be tested of roughened material, or a coat of paint, varnish or other, whose skin frictional properties are to be tested. A nozzle is illustrated in FIG. 1. However, other flow-conducting apparatus could be used such as, for example, a cylinder of uniform diameter, or of shapes other than cylindrical, or nozzles shaped different from that illustrated.

In the embodiment of FIG. 1 the force of gravity is used to keep the nozzle extension seated. In FIG. 3 springs 8 are illustrated. They may be used to counteract a portion of the force of gravity in order to obtain lift-off with a lower degree of skin friction. Or, if it should be necessary to operate the apparatus in an upside-down position, or other, tension springs could be used to hold the nozzle extension seated until a predetermined degree of skin friction encountered. By proper selection of spring force in relation to gravitational force a very light lift-off force or skin friction can be measured. Or, by using springs to help hold the nozzle extension seated, higher skin friction forces can be measured.

I claim:

1. Skin friction measuring apparatus comprising an upright nozzle to conduct a fluid stream therethrough in an upwardly direction, an extension ring loosely seated on top of said nozzle,
   the inner width of said extension ring being substantially the same as the inner width of the tip of said nozzle,
   said extension ring remaining seated on top of said nozzle by gravity until the skin frictional force exerted by the fluid stream on the inner surface of said extension ring becomes great enough to lift off said extension ring from the top of said nozzle, and electrical make and break means mounted on said nozzle and said extension ring for actuating an electrical signal when said extension ring is lifted from said nozzle by said skin frictional force.

2. Apparatus as in claim 1, wherein said nozzle extension ring has a sharp circular top edge.

3. Apparatus according to claim 1, wherein the mouth of said nozzle has a sharp circular edge.

4. Apparatus according to claim 3, wherein said nozzle extension ring has a sharp circular top edge.

5. Apparatus according to claim 1, wherein said signal is a lighted electric lamp.

6. Apparatus as in claim 1 wherein said nozzle is a high velocity nozzle.

* * * * *